United States Patent [19]
Sato et al.

[11] Patent Number: 6,099,104
[45] Date of Patent: *Aug. 8, 2000

[54] PRINTING METHOD BY INK JET AND A PRINTING DEVICE BY INK JET

[75] Inventors: Akito Sato; Hideo Yamazaki, both of Nagano, Japan

[73] Assignee: Seiko Epson Corporation, Nagano, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/553,677

[22] PCT Filed: May 10, 1995

[86] PCT No.: PCT/JP95/00889

§ 371 Date: Dec. 11, 1995

§ 102(e) Date: Dec. 11, 1995

[87] PCT Pub. No.: WO95/31334

PCT Pub. Date: Nov. 23, 1995

[30] Foreign Application Priority Data

May 11, 1994 [JP] Japan ..................... 6-097677

[51] Int. Cl.[7] ................................. B41J 2/205
[52] U.S. Cl. ....................................... 347/15
[58] Field of Search ................... 347/15, 43, 41, 347/19; 358/298

[56] References Cited

U.S. PATENT DOCUMENTS

| | | | |
|---|---|---|---|
| 4,050,077 | 9/1977 | Yamada et al. | 347/75 |
| 4,710,784 | 12/1987 | Nakayama | 347/15 |
| 4,714,964 | 12/1987 | Sasaki | 358/298 |
| 5,412,410 | 5/1995 | Rezanka | 347/15 |
| 5,617,123 | 4/1997 | Takaoki et al. | 347/15 |
| 5,729,259 | 3/1998 | Gotoh et al. | 347/43 |
| 5,745,131 | 4/1998 | Kneezel et al. | 347/15 |

FOREIGN PATENT DOCUMENTS

| | | | |
|---|---|---|---|
| 0 372 826 | 6/1990 | European Pat. Off. | H04N 1/40 |
| 0 513 989 | 11/1992 | European Pat. Off. | B41J 2/205 |
| 0 580 376 | 1/1994 | European Pat. Off. | G06K 15/10 |
| 2-253958 | 10/1990 | Japan | B41J 2/01 |
| 3-231861 | 10/1991 | Japan | B41J 2/21 |
| 4/259566 | 9/1992 | Japan | B41J 2/21 |

OTHER PUBLICATIONS

Patent Abstracts of Japan, vol. 009, No. 111 (M–379), May 15, 1985, & JP–A–59 232877 (Fujitsu KK), Dec. 27, 1984, *Abstract.

*Primary Examiner*—N. Le
*Assistant Examiner*—Craig A. Hallacher
*Attorney, Agent, or Firm*—Sughrue, Mion, Zinn, Macpeak & Seas, PLLC

[57] ABSTRACT

An amount of ink droplet to form a dot (Ds) that is printed every plural dots (Dn) of normal size is smaller than an amount of ink droplet to form the normal dot (Dn). The special dots (Ds) receive excessive ink from the normal dots (Dn). Deterioration of the print quality, caused by the handing down of ink, is eliminated irrespective of the kind of a material of a print medium.

12 Claims, 11 Drawing Sheets

FIG. 12(III)
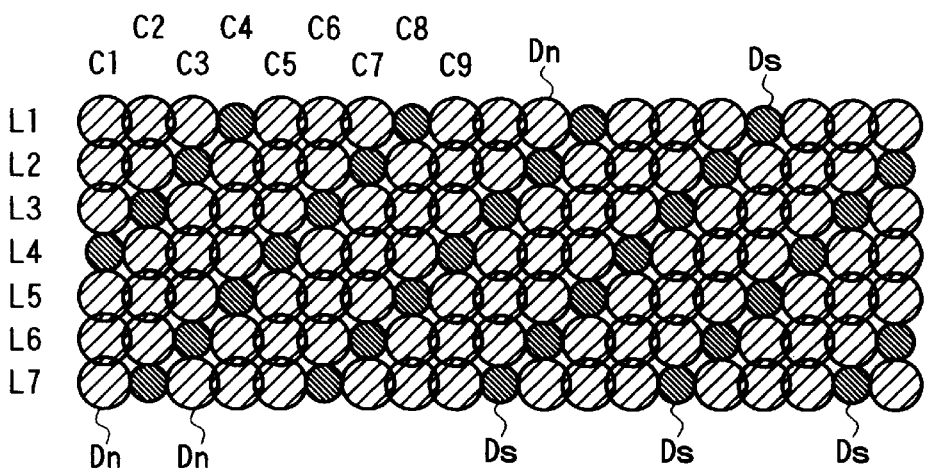

PRINTING METHOD BY INK JET AND A PRINTING DEVICE BY INK JET

FIELD OF THE INVENTION

The present invention relates to a technique for printing an image on a print medium by jetting ink droplets through nozzle openings against the print medium in accordance with print data.

DISCUSSION OF THE PRIOR ART

In printing an image on a print medium by jetting ink droplets through nozzle openings against the print medium, an amount of ink droplet is controlled so that the adjacent dots are as close as possible to each other, in order to improve the print quality.

There are various kinds of print media. Those print media are different in wettabilities to ink and ink absorbing rates. Ink droplets successively landing on the print medium attract to each other to form a large ink droplet, which in turn moves along fibers of the print medium. This phenomenon is frequently observed in the print of ruled lines and graphic pattern, which are formed by successively jetting ink droplets.

Japanese Patent Application Laid-open Nos. Hei. 3-231861 and 4-259566, for example, discloses methods for solving those problems inevitable in the ink jet printing device. In those methods, ink droplets are shot forth every other dot in the main and vertical scan directions in the first scan. In the second scan, ink droplets are shot forth against the regions where dots were not printed in the first scan. Thus, the time to print one dot is made different from the time to print another dot adjacent to the former.

Two scan operations are used for printing a pattern on the region on which a pattern can be printed by one scan operation. This remarkably makes the printing speed slow.

There is a proposal to reduce a mixing of color inks in a manner that an amount of color ink first used is set to be smaller than a predetermined amount of ink (Japanese Patent Application Laid-open No. Hei. 2-253958). The proposal requires a fine adjustment of ink amounts. Further, it cannot solve the above problem of the monochromatic printing in which one dot is printed at one position.

Accordingly, an object of the present invention is to provide a novel printing method by ink jet which can eliminate the handing down of ink and ink blot in both monochromatic and color prints, without making the printing speed slow.

Another object of the present invention is to provide a printing method by ink jet which can print thin patterns, such as ruled lines, in a clearly-delineated fashion.

Still another object of the present invention is to provide a printing method by ink jet which can minimize ink blot in a color print.

A further object of the present invention is to provide a printing device for realizing the printing methods as mentioned above.

DISCLOSURE OF THE INVENTION

According to the present invention, there is provided a printing method in which dots are formed on a print medium by shooting forth ink droplets against the print medium while moving a print head having a plural number of nozzle openings in the main scan direction, characterized in that an amount of ink used to form a dot that is printed every dots in the main scan direction is smaller than an amount of ink used to form each of the other dots by a predetermined amount of ink.

The dots formed by the reduced amount of ink droplets receive excessive ink, to thereby eliminate the irregular ink flow along fibers of a print medium.

Elimination of irregular ink blot provides clearly delineated lines and images of clear edges.

When the invention is applied to a color print, the resultant color image is clear and sharp since the out-of-register condition of colors caused by the ink blot and the handing down of ink are eliminated.

DESCRIPTION OF THE DRAWINGS

FIGS. 7(a) and 7(b) through FIGS. 8(a) and 8(b) show examples of dot patterns printed by the printing device.

BEST MODES OF THE INVENTION

Embodiments of the present invention will be described with reference to the accompanying drawings.

Figure 1:
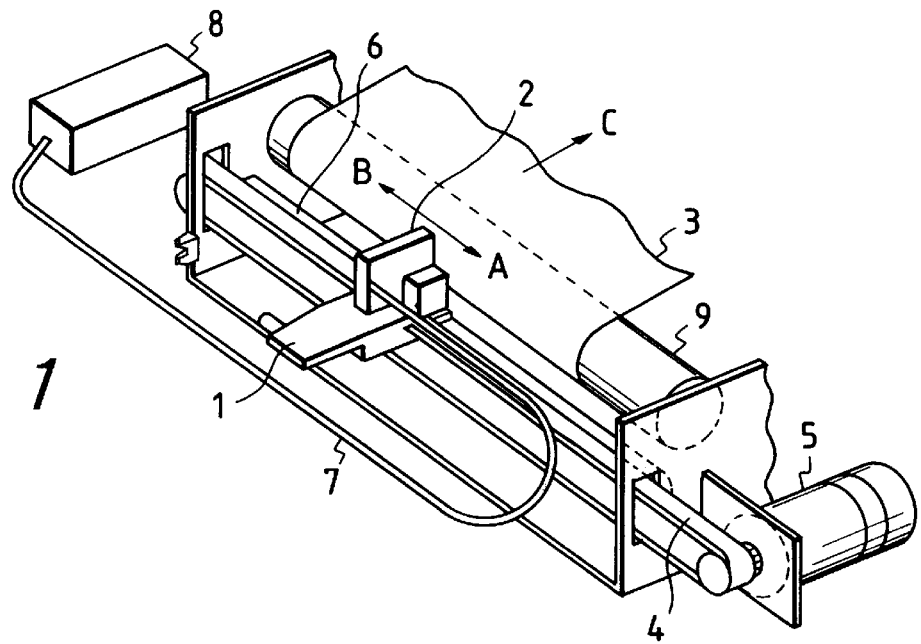
FIG. 1 is a view showing an embodiment of an ink jet printing device incorporating the present invention thereinto.

FIG. 1 shows an embodiment of the present invention. In the figure, reference numeral 1 designates a carriage. An ink jet print head 2 which faces a print sheet 3 is mounted on the carriage 1. The carriage 1, coupled through a timing belt 4 with a drive motor 5, is reciprocatively movable along the width of the print sheet 3 (in the directions of arrows A and B in the figure), while being guided by a guide member 6.

The ink jet print head 2 receives ink from an ink tank 8, with its connection through an ink supply tube 7 to the ink tank 8. Numeral 9 designates a sheet transport roller. The sheet transport roller 9, when driven by a drive motor (not shown), transports the print sheet 3 in the direction (of an arrow C in the figure) perpendicular to the moving direction of the carriage 1.

Figure 2:
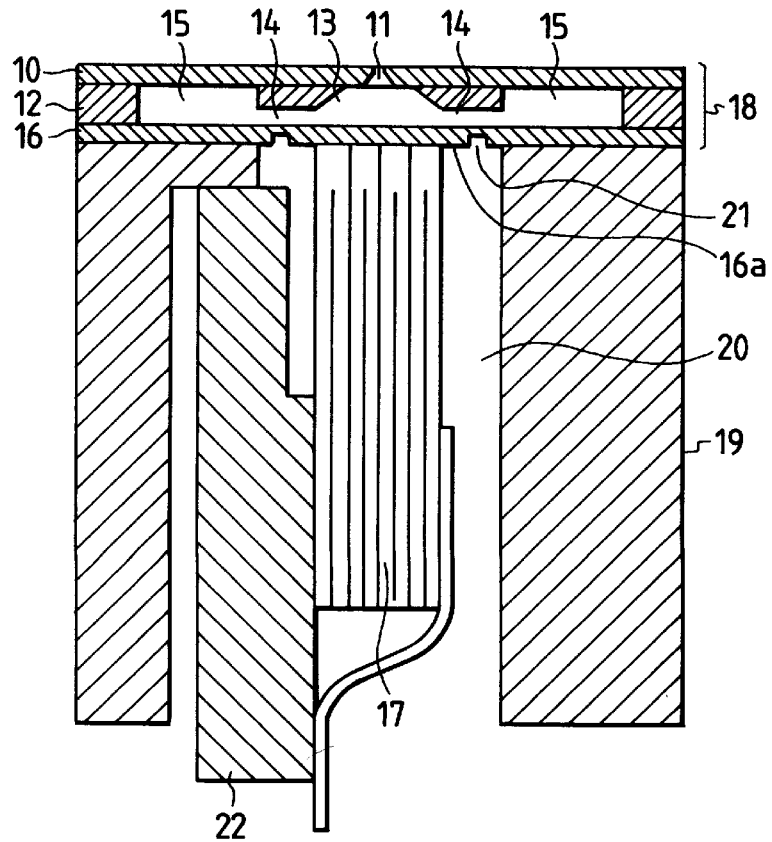
FIG. 2 is a view showing an embodiment of an ink jet print head.

In FIG. 2 showing an embodiment of the print head. Reference numeral 10 designates a nozzle plate having nozzle openings 11 formed therein. Numeral 12 indicates a fluid path forming plate which includes a through hole defining a pressure generating chamber 13, through holes or grooves defining ink supply ports 14 and 14 communicatively coupled with both sides of the pressure generating chamber 13, and a through hole defining two common ink chambers 15 and 15 communicatively coupled with these ink supply ports 14 and 14. Numeral 16 represents a vibrating plate elastically deformable while being brought into contact with the top of a piezoelectric vibrator 17. The nozzle plate 10 and the vibrating plate 16 are liquid tightly fastened onto the major surfaces of the fluid path forming plate 12, respectively, to thereby form a substrate unit 18.

Reference numeral 19 designates a base including an inner space 20 within which the piezoelectric vibrator 17 is placed in a state that it can vibrate. More specifically, within the inner space 20, the base part of the piezoelectric vibrator 17 is fixed to a fixing member 22, while the top of the piezoelectric vibrator 17 is brought into contact with an island 16a of the vibrating plate 16 in an opening 21 of the base 19.

Figure 3:
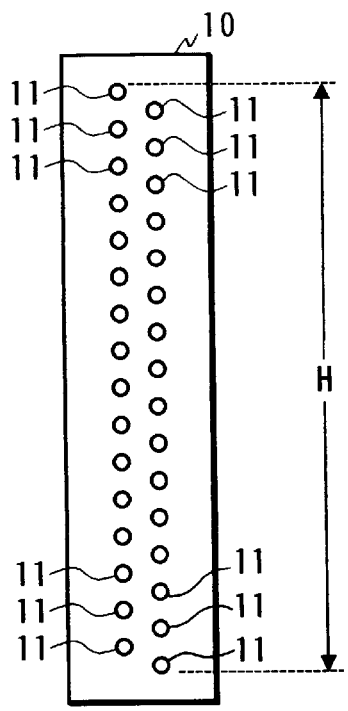
FIG. 3 is a view showing a pattern of nozzle openings of the print head.

An area of the top of the piezoelectric vibrator 17 may be reduced to be extremely small since the piezoelectric vibrator 17 vibrates in a longitudinal vibration mode. Therefore, the volume of the pressure generating chamber 13 may also be designed to be extremely small. Two linear arrays of nozzle openings 11, formed in the nozzle plate 10, are arranged parallel to each other and in a zig-zag fashion, as shown in FIG. 3.

Black ink, used in the ink jet print head thus constructed, contains 2 wt % of carbon black, and color ink used contains 1.5 wt % of pigment, 5 wt % of such solvent as diethylene glycol, 15 wt % of such resin emulsion as styrene acrylic acid ester copolymer, 7 wt % of maltose, and the remainder of pure water.

The ink thus composed exhibits the following physical properties: viscosity is 3 to 5 mPa·S at normal temperature and surface tension is 30 to 50 mN/m. The ink jet print head 2 filled with this ink, when driven in a normal drive mode, is capable of shooting forth an ink droplet of 0.04 μg, and forming a dot of 60 μm in diameter on a typical print sheet. Therefore, it can draw a continuous line when it shoots forth an ink droplet every 1/720 inch of the movement of the print head.

Figure 4:
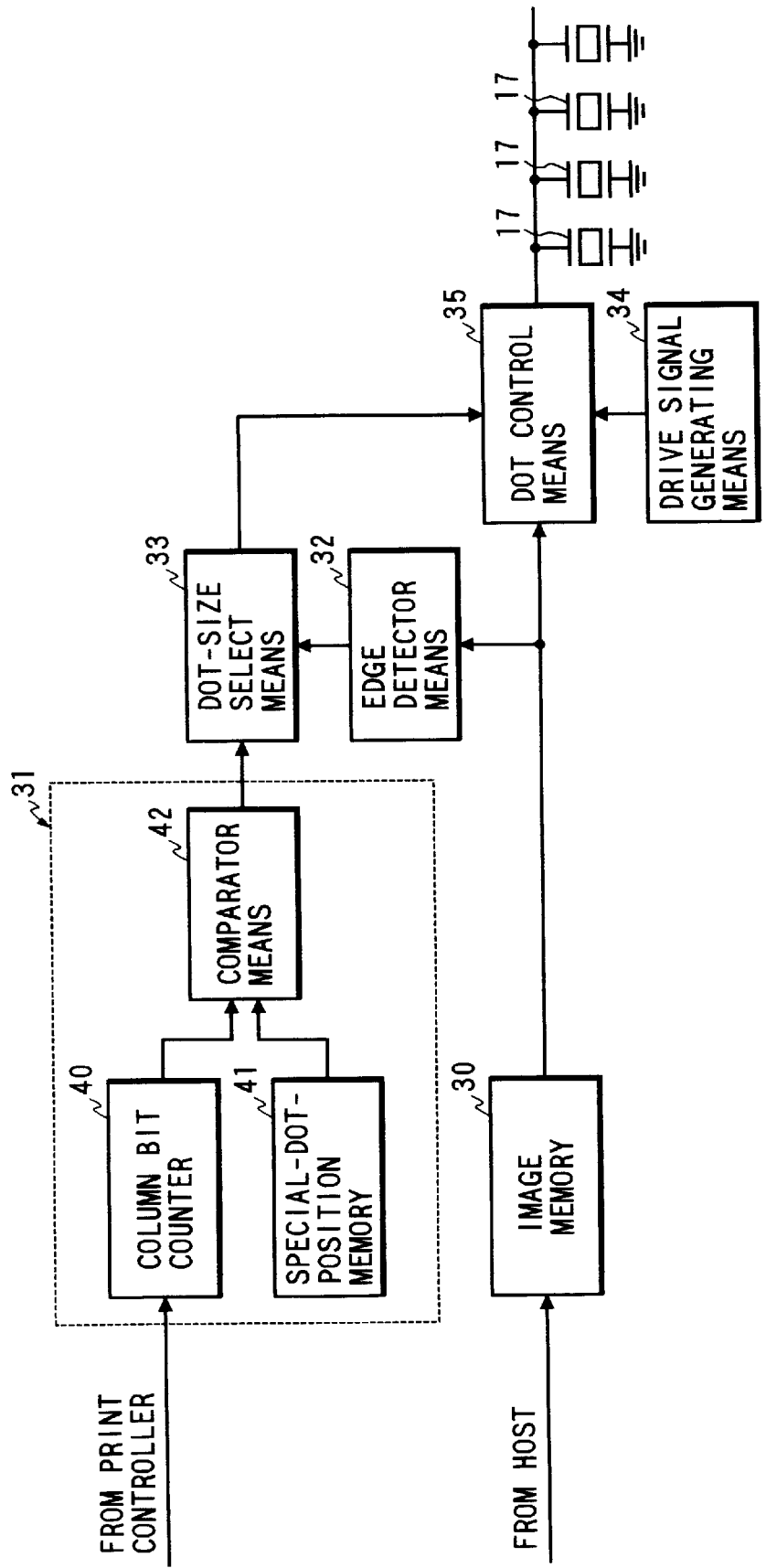
FIG. 4 is a block diagram showing a print controller according to the present invention.

FIG. 4 shows an arrangement of a print controller for controlling the printing operation of the print head.

The print controller includes an image memory 30 for storing print data coming from a host device, specific position determining means 31, edge detector means 32 which judges as to whether or not the data to be printed is located at the edge, on the basis of data of the image memory 30, dot-size select means 33 for determining the size of a dot to be printed at a specific position, and dot control means 35 for receiving a signal from drive signal generator means 34 and outputting signals to the respective piezoelectric vibrators 17 so that the print data from the image memory 30 will be printed with a dot of the specified size.

The specific position determining means 31 includes a column bit counter 40 for detecting a position of the carriage 1 relative to a print start position in the main scan direction in the form of the number of bits, a special-dot-position memory 41 for storing data indicative of the position where a special dot Ds which are different in size from a normal dot are to be printed, and comparator means 42 which produces a signal when the contents of the column bit counter 40 are coincident with those of the special-dot-position memory 41.

Figure 5A:
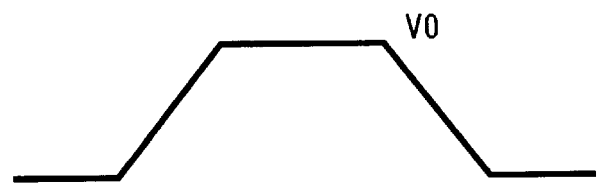
FIGS. 5(a) to 5(d) show a set of waveforms of drive signals used in the print controller.

The drive signal generator means 34 generates a first voltage signal and a second voltage signal, as shown in FIG. 5(a). In response to the first voltage signal, the piezoelectric vibrator 17 compresses at a fixed rate, to thereby cause the ink chamber to suck ink. In response to the second voltage signal, the piezoelectric vibrator 17 expands at a fixed rate, to thereby cause the ink chamber to shoot forth ink in the form of a droplet through the nozzle opening.

The operation of the dot control means 35 follows. To form a normal dot Dn, the dot control means 35 receives the signal (referred to as a normal voltage signal) from the drive signal generator means 34, and transfers it to the piezoelectric vibrator 17. To form a special dot (different in size from the normal dot) at a specific position, the dot control means 35 selects one of the following three signals from the drive signal generator means 34 in accordance with a signal from the dot-size select means 33, and transfers the selected one to the piezoelectric vibrator 17. Those three signals are: a signal (FIG. 5(b)) (referred to as a first voltage signal) whose level is somewhat lower than the signal (FIG. 5(a)), a signal (FIG. (c)) (referred to as a second voltage signal) (FIG. 5(c)) causing the ink chamber to set forth no ink droplet, and an amplified signal (FIG. 5(d)) (referred to as a third voltage signal).

Figure 6:
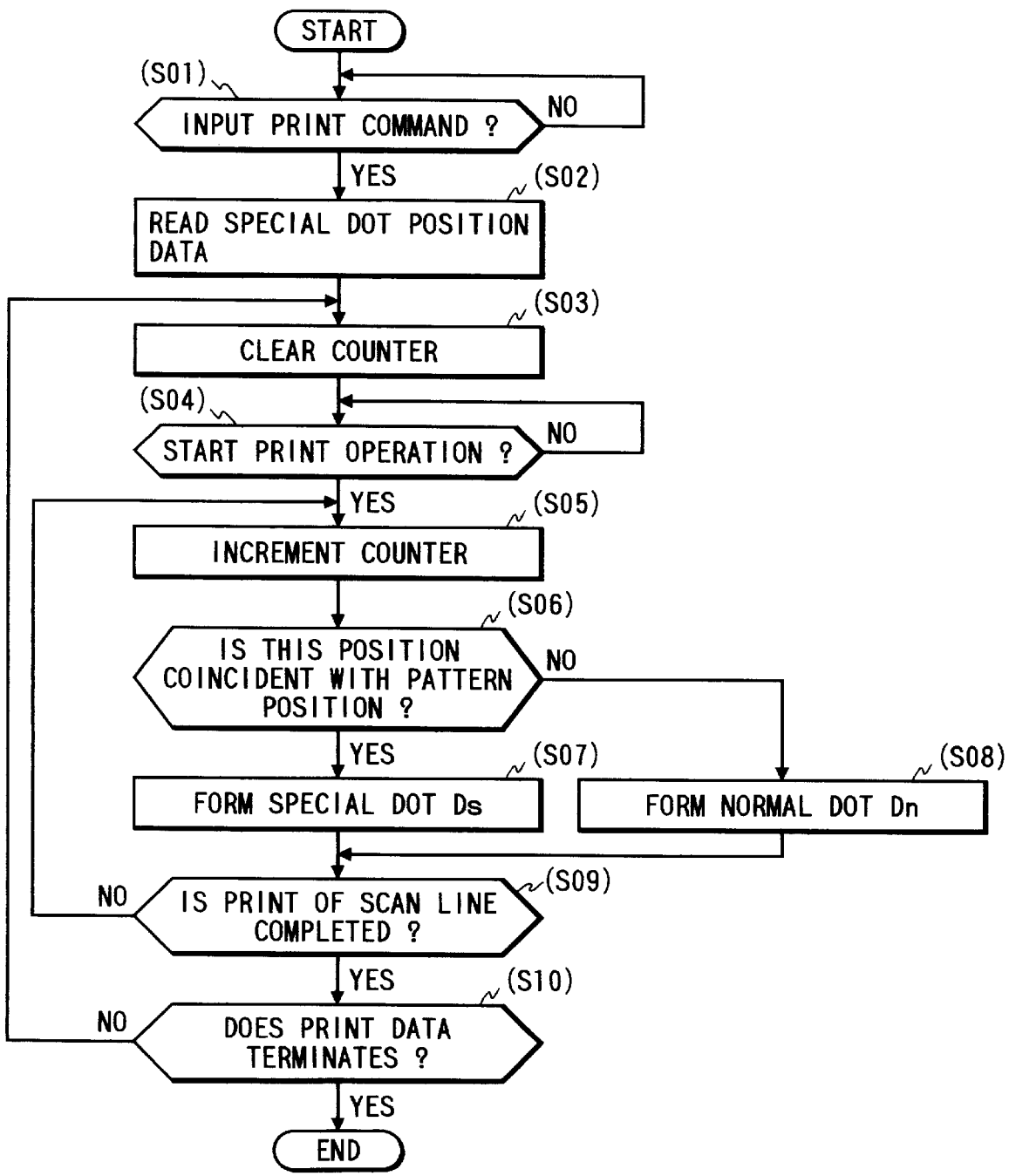
FIG. 6 is a flow chart showing the operation of the print controller.

The operation of the print controller thus arranged will be described with reference to a flow chart shown in FIG. 6.

In response to a print command from a host device (step S01), the print controller reads data from the special-dot-position memory 41, to thereby determine positions at which special dots Ds are to be printed (step S02).

Figure 7A:
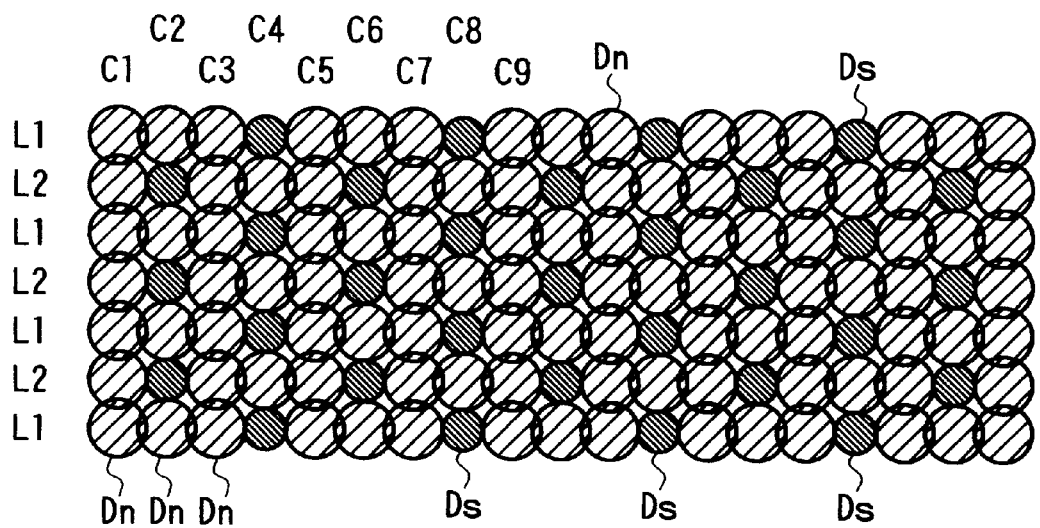

In this embodiment, the specific positions of the special dots Ds, as shown in FIG. 7(a), are the 4th, 8th, 12th, 16th, . . . columns of the odd-numbered main scan line L1, and the 2nd, 6th, 10th, and 14th columns on the even-numbered main scan line L2.

The print data enters the image memory 30, the carriage 1 starts to scan, and the ink jet print head 2 reaches a print region. At this time, the column bit counter 40 is cleared (step S03), a print operation starts (step S04), and the column bit counter 40 starts to count (step S05).

In this embodiment, the print at the first column C1 is handled. Then, it is not coincident with the pattern position (step S06) and no output signal is produced from the comparator means 42. Accordingly, the dot control means 35 receives a signal (FIG. 5(a)) from the drive signal generator means 34, and transfers it to the ink jet print head 2. In turn, the ink jet print head 2 shoots forth a preset quantity (0.04 μg in the embodiment) of ink against a print medium, to thereby form a dot of the normal size (60 μm in diameter in the embodiment) thereon (step S07).

The column bit counter 40 is incremented every time the print of one column is completed (step S05). The comparator means 42 compares the contents of the column bit counter 40 with those of the special-dot-position memory 41 (step S06).

When the ink jet print head 2 moves to reach the print position of the 2nd column C2, the number of the columns of the odd-numbered line L1 is not coincident with the contents of the special-dot-position memory 41, but the number of the columns of the even-numbered line L2 are equal to a value stored in the special-dot-position memory 41.

Figure 5B:
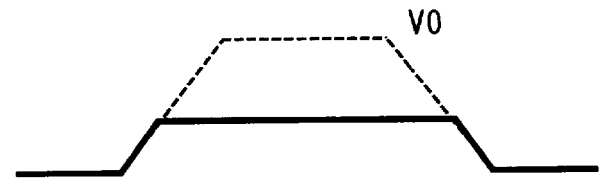
Figure 5C:
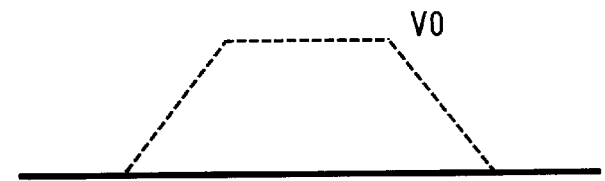
Figure 5D:
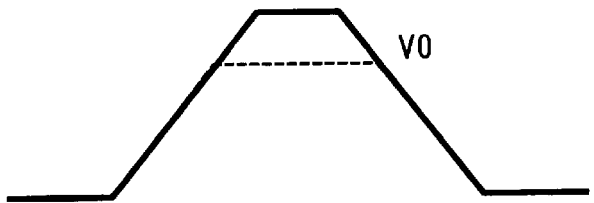

Therefore, the dot-size select means 33 receives a first voltage signal (FIG. 5(b)) from the drive signal generator means 34, and transfers it to the piezoelectric vibrator 17, which is associated with the nozzle opening 11 aligned with the even-numbered line L2. The same transfers a normal voltage signal (FIG. 5(a) that is received from the drive signal generator means 34, to the piezoelectric vibrator 17 associated with the nozzle opening 11 aligned with the odd-numbered line L1 of the 2nd column C2.

As a result, a normal dot Dn is printed on the odd-numbered line L1 of the 2nd column C2 (step S07), and a special dot Ds (smaller than the normal dot Dn in the embodiment) is printed on the even-numbered line L2 of the same column (step S08).

Every time the print of one column is thus completed (step S09), the column bit counter 40 is incremented (step S05), and the comparator means 42 compares the contents of the column bit counter 40 with those of the special-dot-position memory 41 (step S06). If those are coincident with each other, the dot-size select means 33 transfers a first voltage signal (FIG. 5(b)) to the piezoelectric vibrator 17, which is associated with the nozzle opening aligned with either of the odd- or even-numbered line (step S08), and transfers a normal voltage signal (FIG. 5(a)) to other piezoelectric vibrators 17 (step S07).

The thus printed dots are arrayed as shown in FIG. 7(a). As shown, one small special dot Ds is located every three normal dots Dn on each line, and the special dots Ds on the odd- and even-numbered lines L1 and L2 are arranged such that the adjacent special dots Ds are horizontally spaced a distance of at least one dot (normal dot Dn).

Thus, the dots are printed in such a print pattern that one special dot Ds is located every three normal dot Dn on each horizontal line, and the special dots Ds on the two adjacent lines are not aligned with each other in the vertical direction. In the print pattern, a less amount of an ink droplet lands on the position of each special dot Ds. An excessive ink at the positions of the normal dots Dn on the print medium flows to the positions of the special dots Ds. As a result, the special dots Ds approach in size to the normal dots Dn, so that one cannot distinguish the special dots Ds from the normal dots Dn. The flow of the excessive ink is free from the restriction by the fibers of the print medium, for example. No irregular blot of ink occurs to the print medium.

Upon completion of the print of one line (step S09), the print controller vertically feeds the print medium at least a distance corresponding to the effective print height H (FIG. 3) of the print head. The print controller repeats the sequence of the print steps until the print data terminates (step S10).

In the above-mentioned embodiment, the special dot Ds is a small dot. In a case where a print sheet of a low ink absorbing rate is used, it is preferable to shoot forth no ink droplets to the positions on the print sheet which receive the special dots Ds (FIG. 7(b)). That is, the dot-size select means 33 sends a second voltage signal (FIG. 5(c)) for causing the ink chamber to set forth no ink droplet, to the related piezoelectric vibrators 17. Therefore, the excessive ink of the normal dots Dn is absorbed to the maximum, to thereby eliminate the hanging down and blot of ink perfectly.

Figure 8A:
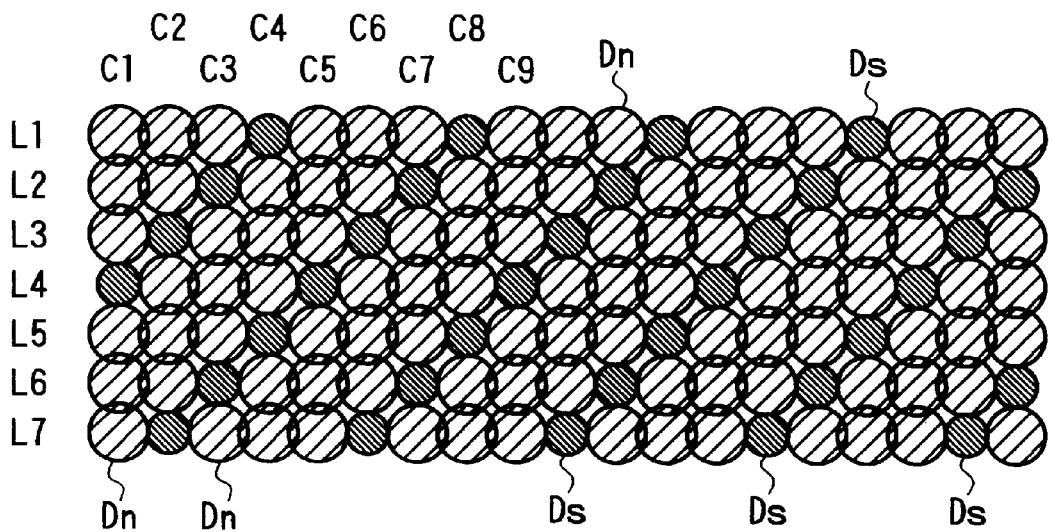
Figure 8B:
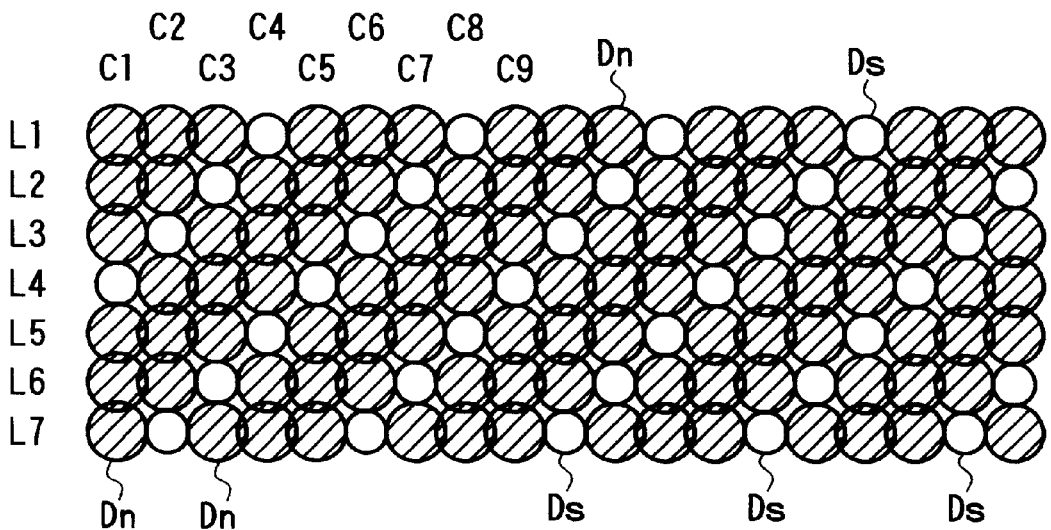

In the pattern of the special dots Ds in the above-mentioned embodiment, the special dots Ds on the odd- and even-numbered lines L1 and L2 are arranged such that the adjacent special dots Ds are horizontally spaced a distance of at least one dot (normal dot Dn). Another pattern of the special dots Ds, which may be used, is shown in FIGS. 8(a) and 8(b). As shown, the special dots Ds on the odd- and even-numbered lines L1 and L2 are arranged such that the adjacent special dots Ds have no space therebetween, whereby slanted linear arrays of the special dots Ds are formed.

In the above-mentioned embodiment, the special dots Ds are studded in the entire dot pattern. To print a line segment of the type in which the thickness thereof is particularly thin and the ink blot at the boundaries or edges is noticeable, as of ruled lines, the edge detector means 32 is operated to print the special dots Ds of small amount of ink only along the edges of the line. The resultant line little suffers from ink blot.

Figure 9:
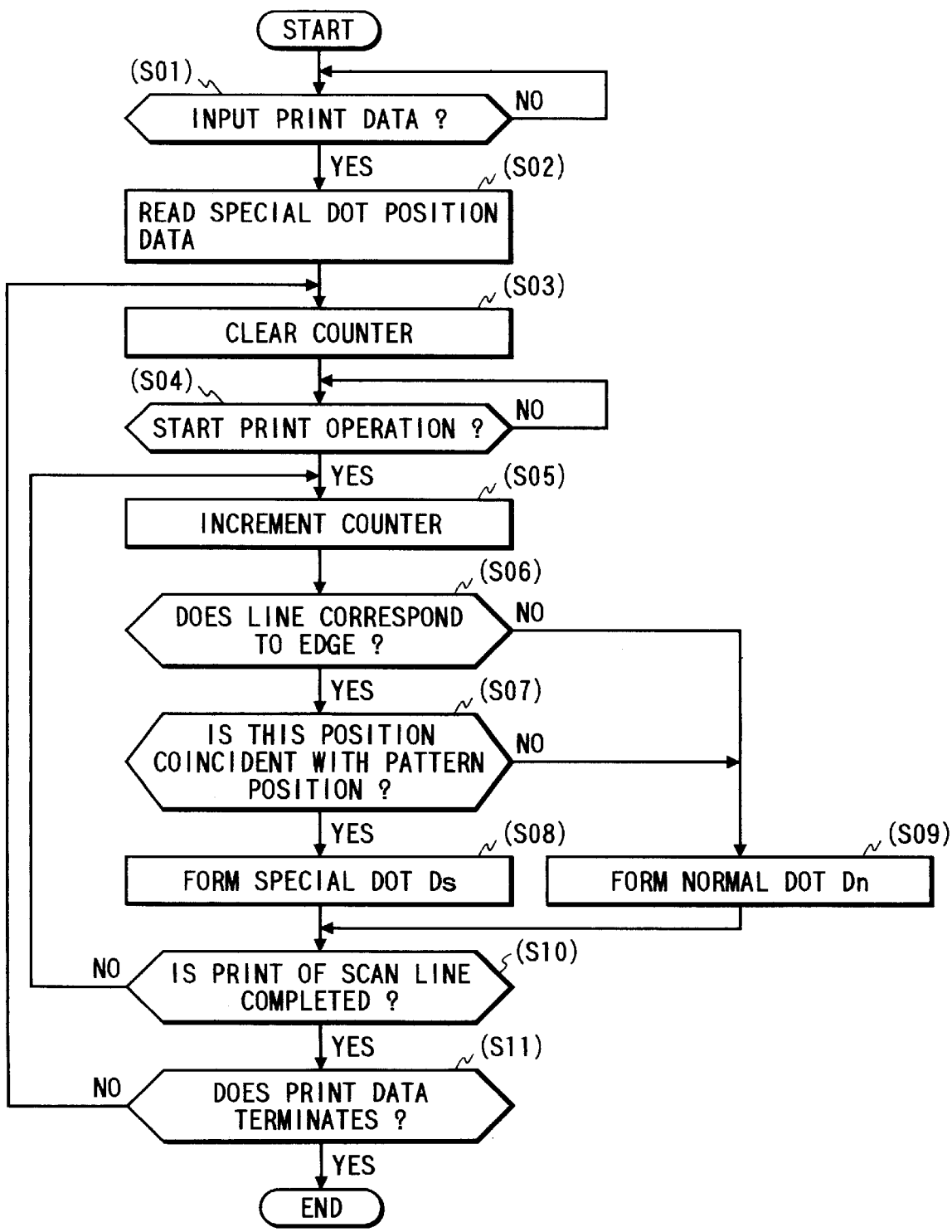
FIG. 9 is another flow chart showing the operation of the print controller.

A method of printing the special dots only along the edges of the line, for example, will be described with reference to a flow chart of FIG. 9.

In response to a print command from a host device (step S01), the print controller reads data from the special-dot-position memory 41, to thereby determine positions at which special dots Ds are to be printed (step S02).

In this embodiment, the number n (n: integer) of the normal dots Dn is designated for the special dot positions. In this embodiment, n is 4. That is, data such that the print positions of the special dots Ds on the main scan line are 4, 8, 12, and 16 (FIG. 10) is designated. The print data enters the image memory 30, the carriage 1 starts to scan, and the ink jet print head 2 reaches a print region. In turn, the column bit counter 40 is cleared (step S03), and the printing operation starts (step S04). With progress of the printing, the column bit counter 40 is incremented (step S05).

The first line L1 corresponds to the edge (step S06). It is not coincident with a pattern position stored in the special-dot-position memory 41 since the present print is for the first column Cl (step S07). Then, no signal is produced from the comparator means 42.

In this state, the dot control means 35 transfers a normal voltage signal (FIG. 5(a)) that is received from the drive signal generator means 34, to the print head 2. A preset amount of ink is forcibly discharged through the related nozzle opening 11 against the print medium. The result is formation of a normal dot Dn on the print medium (step S09).

The column bit counter 40 is incremented every one column print (step S05). The edge detector means 32 checks as to whether or not a pattern to be printed is the edge (step S06). In this way, the printing operation progresses to reach the print of the fourth column C4. At this time, the contents of the column bit counter 40 is equal to a value of the special-dot-position memory 41 (step S07). Then, the dot-size select means 33 transfers a first voltage signal (FIG. 5(b)) that is received from the drive signal generator means 34, to the piezoelectric vibrators 17 associated with the nozzle openings aligned with the first and third lines L1 and L3. And the dot-size select means 33 transfers a normal voltage signal (FIG. 5(a)) that is received from the drive signal generator means 34, to the piezoelectric vibrator 17 associated with the nozzle opening aligned with the second line L2.

As a result, the special dots Ds, smaller in size than the normal dot Dn, are printed at the fourth column of the first and third lines L1 and L3 (step S08). The normal dots Dn are printed on the second line L2 (step S09).

In this way, every time the print of one column is completed, the column bit counter 40 is incremented (step S05). The lines L1 and L3, which form the edges, are compared with the contents of the special-dot-position memory 41 (step S07). If the result is the coincidence between them, the special dot Ds is printed (step S08). This sequence of the steps is repeated.

Figure 10A:
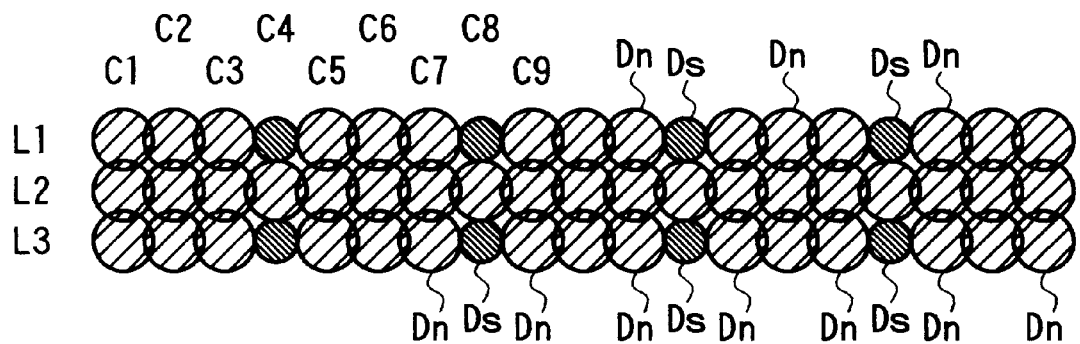
FIGS. 10(a) and 10(b) show examples of dot patterns printed according to the control of the flow chart.

The small special dots Ds are regularly printed every three dots on the lines L1 and L3 which define the boundaries of a line segment (FIG. 10(a)). Excessive ink on those lines flows to the special dots Ds, to thereby eliminate the irregular blot of ink that otherwise would be caused by fibers of the print paper. The resultant line is clearly delineated.

Figure 10B:
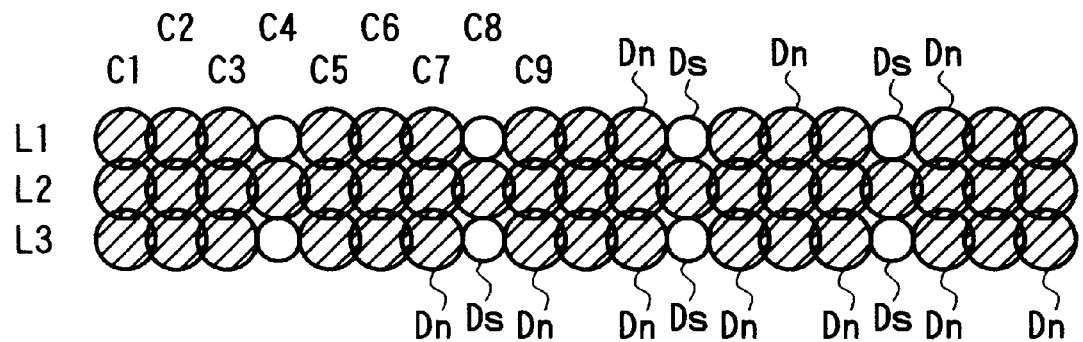

In the above-mentioned embodiment, the amount of the special dot Ds, which is printed on the boundaries of a line segment, is reduced. For some type of the print paper, the amount of the special dot Ds may be reduced to zero as shown in FIG. 10(b).

The print of lines is discussed in the above-mentioned embodiments. The printing method of the present invention may be applied to a print of the type in which a specific area is painted out, such as a graphic print. In this case, the peripheral edge of the painted-out area little suffers from an irregular blot of ink. In other words, a clearly delineated painted-out area is presented.

Figure 11:
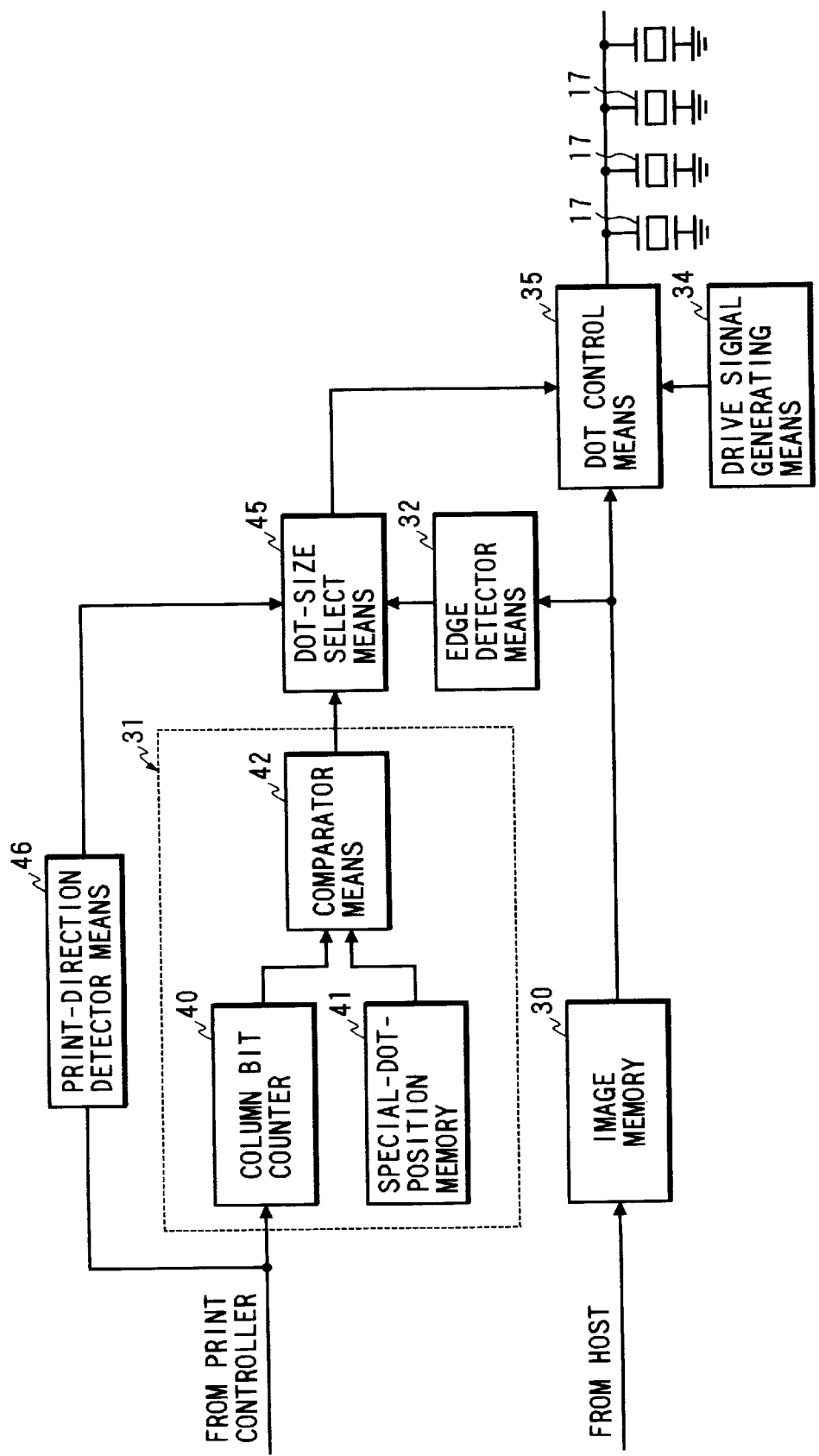
FIG. 11 is a block diagram showing another print controller according to the present invention, and FIGS. 12(I) to 12(III) are diagram showing an example of dot pattern printed and useful in explaining the operation of the print controller.

FIG. 11 shows an arrangement of a print controller for controlling the printing operation of the print head, which is another embodiment of the present invention. In the figure, reference numeral 45 designates dot-size select means. The dot-size select means 45 determines a print direction on the basis of a signal outputted from a print-direction detector means 46. In response to a signal representative of a first or forward direction of the print, which is produced by the print-direction detector means 46, the dot-size select means 33 selects a second voltage signal (FIG. 5(c)), which causes the ink chamber to set forth no ink droplet every preset number (e.g., four dots) of dots stored in the special-dot-position memory 41, for the data of the positions which are not arrayed adjacent to each other in the vertical scan direction. For other positions than the above ones, the dot-size select means 33 selects a normal voltage signal (FIG. 5(a)) for forming the normal dots Dn, and rids of the designated dots in the special-dot-position memory 41. In the print of the second or backward direction, the dot-size select means 45 selects a first voltage signal (FIG. 5(b)) for forming the special dot Ds of small size at the positions of the dots that were removed in the forward print.

Figure 12I:
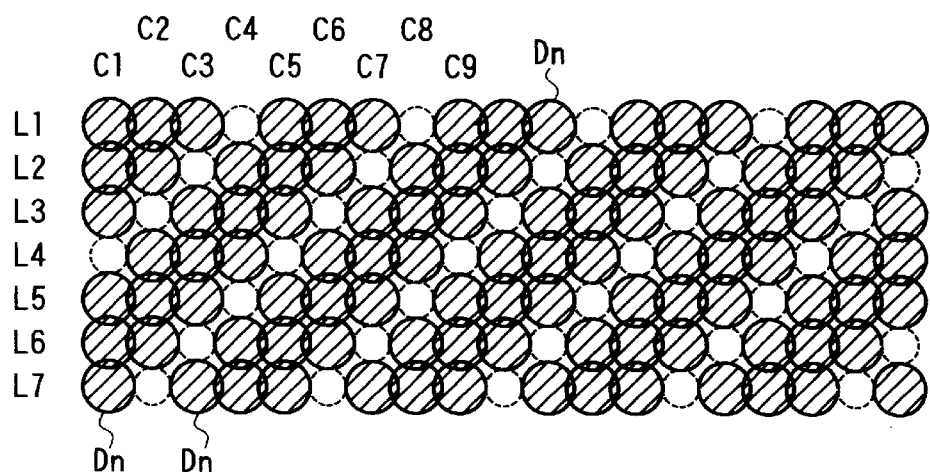

In this embodiment, when color image data enters the image memory 30 from a host device, in the forward print mode, the normal dots Dn are printed at other column positions other the specific positions, while dots are removed every specified position, or four dot columns (FIG. 12(I)). Accordingly, excessive ink of the normal dots Dn flows to the empty positions formed every plural number of dots, four dots in the embodiment, as viewed in the main scan direction. As result, the irregular blot of ink does not occur on the paper.

Figure 12:
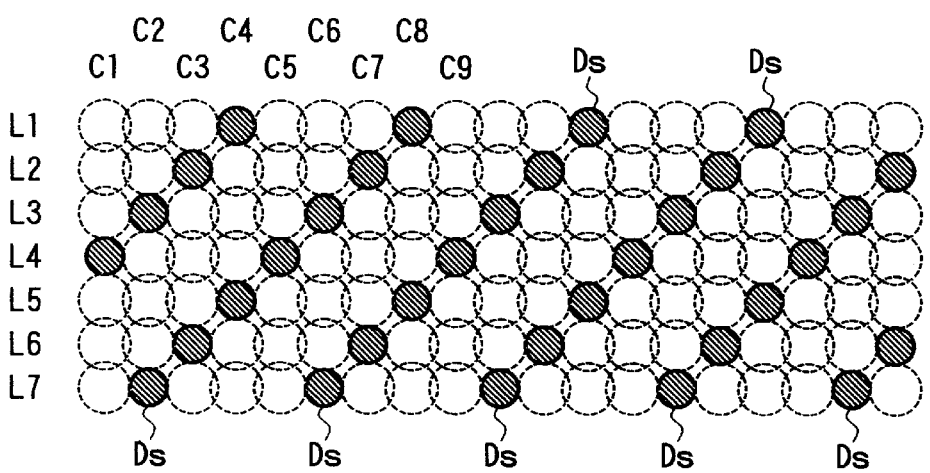

When the forward print is switched to the backward print, the dot-size select means 45 receives a first voltage signal (FIG. 5(b)) from the print-direction detector means 46, so that the print head 2 prints a special dot Ds at the position at which nothing is printed in the forward print mode every time the print head 2 reaches there (FIG. 12(II)). The amount of the special dot Ds is smaller than that of the normal dot Dn formed or printed in the forward print mode (For example, it is 0.3 times as large as that).

A dot pattern formed after the backward print is completed is as indicated by the print data and little suffers from the blot of in, as shown in FIG. 12(III).

Figure 7B:
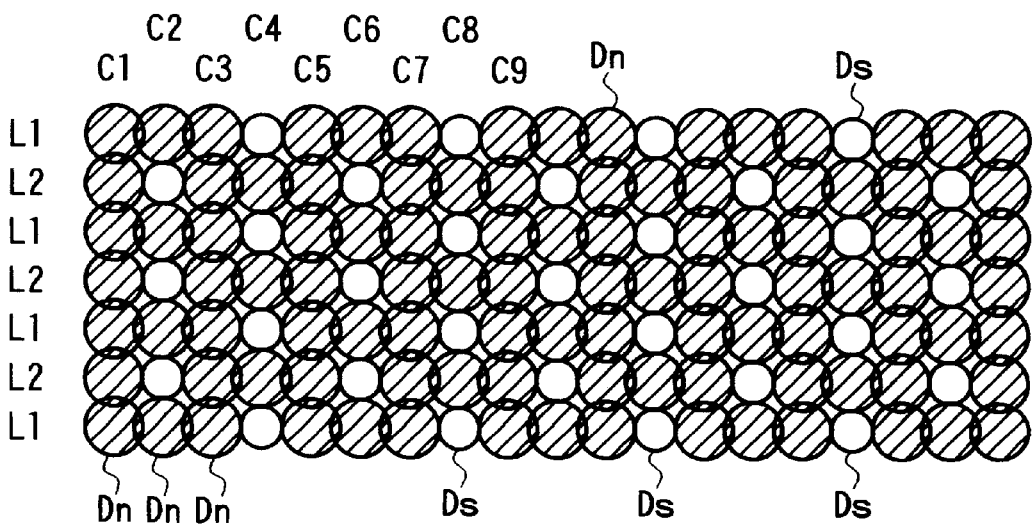

In the above-mentioned embodiments in which empty dots are printed (FIGS. 7(b), 8(b), and 10(b)), the amount of the normal dot Dn printed is the predetermined one. In this case, it may be increased to be 1.2 times as large as the predetermined amount of the normal dot Dn. A third voltage signal (FIG. 5(d)) whose amplitude is higher than that of the normal voltage signal (FIG. 5(a)) for forming the normal dot Dn, is applied to the related piezoelectric vibrators 17. The empty dots can satisfactorily absorb excessive ink of such large normal dots Dn printed. The resultant print has a high density while being free from the hanging down of ink. This printing method is suitable for the bold print.

Figure 13:
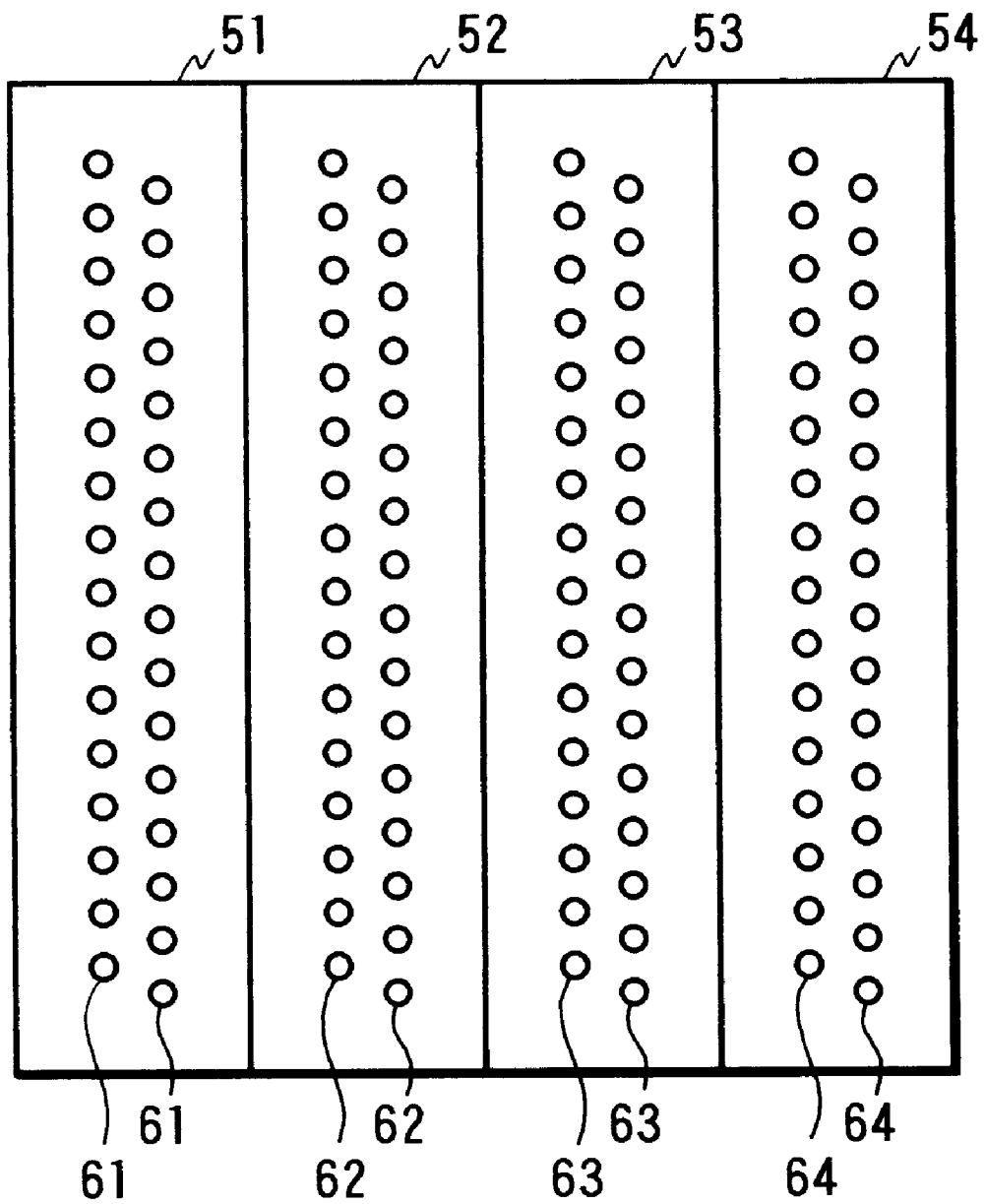
FIG. 13 is a diagram showing nozzle opening patterns of a print head for color print to which the present invention may be applied.

In the embodiments, the present invention was applied to the monochromatic printing. The invention may be applied to a color ink jet print head assembly that is constructed as shown in FIG. 13. As shown, the print head assembly is provided with four print heads 51, 52, 53 and 54 for black, yellow, cyan, and magenta ink. Each print head 51, 52, 53 or 54 has a pattern of two, parallel linear arrays of nozzles openings 61, 62, 63 or 64. In the printing operation, the nozzle opening patterns 61, 62, 63 and 64 of the print heads 51, 52, 53 and 54 are successively set at the same position on the print sheet for printing different color dots there in a superimposed fashion.

Also in the color print head assembly of the invention, the special color dot Ds whose ink amount is smaller than the normal color dot Dn is formed at a predetermined position on a print medium. Accordingly, the resultant color image is free from the dislocation of the dots, the out-of-register of colors, and the blot of ink.

The above-mentioned embodiments each employ the piezoelectric vibrator is used for a means for applying a pressure to the pressure generating chamber. It is evident that the present invention may be applied to a bubble jet print head in which a Joule heat generating element is contained in the pressure generating chamber, and the amount of discharged ink is controlled by adjusting an electric power fed to the Joule heat generating element.

INDUSTRIAL APPLICATION OF THE INVENTION

The print head of the present invention can eliminate the irregular ink flow which otherwise would be caused by fibers of a print medium, without decreasing the print speed, and can make a high quality print on various types of the print medium. The print head can eliminate the irregular ink blot at the edges of a printed picture. Accordingly, the printed picture is clearly delineated, and free from the out-of-register of colors and the hanging down of ink.

What is claimed is:

1. A printing method in which dots are formed on a print medium, comprising the steps of:

moving a print head in a main scan direction;

shooting ink against said print medium to form said dots; and reducing an amount of ink used for dots that are formed at a predetermined interval, wherein the dots formed by the reduced amount of ink droplets are not aligned with each other in a vertical scan direction.

2. The printing method according to claim 1, wherein the reduced amount of ink droplet is $0<$ and $\geq 0.3$ times as large as the amount of ink droplet to form the normal dot.

3. The printing method according to claim 1, wherein the amount of ink droplet to form the normal dot is increased.

4. The printing method according to one of claims 1 to 3, wherein the dots formed by the reduced amount of ink droplets are printed only on the boundary of a pattern.

5. A printing device comprising:

an ink jet print head having a nozzle through which ink can be ejected, an ink supply source providing ink to the head and an ejection mechanism operable to force ink out of said nozzle, an amount of ink ejected being based on a drive voltage, so that a predetermined amount of ink is ejected to form a normal dot;

specific position determining means for determining a specific position in a plurality of rows at which specific dots are formed by an amount of ink that is different from said predetermined amount of ink and outputting a first signal based on said determination, said specific positions in adjacent rows being unaligned vertically;

dot-size select means for selecting an amount of ink in accordance with said first signal from said specific position determining means and outputting a second signal based on said selection; and dot control means for driving the ink jet print head by controlling a magnitude of said drive voltage based on said second signal from said dot-size select means boundary of a pattern.

6. The printing device according to claim 5, further comprising edge detector means for detecting a boundary of a pattern from the data of said image memory.

7. A printing method in which dots are formed on a print medium by shooting forth ink against the print medium while moving a print head having at least one nozzle opening in a main scan direction, comprising the steps of:

shooting a first amount of ink for each of a plurality of normal dots through a nozzle opening to form the normal dots on the print medium along the main scan direction, leaving blank dots dispersed among the normal dots at a predetermined interval; and subsequently shooting forth ink at the locations of the blank dots in amounts that are less than the first amount.

8. The printing method according to claim 7, wherein the ink amount shot at the blank dots in said second shooting step is 0.34 times as large as the first ink amount.

9. The printing method according to claim 7, wherein the amount of ink is increased in said first shooting step, and the amount of ink is decreased in said second shooting step.

10. A printing device comprising:

an ink jet print head having a nozzle through which ink can be ejected, an ink supply source providing ink to the head and an ejection mechanism operable to force ink out of said nozzle, the amount of ink ejected being based on a drive voltage;

specific position determining means for determining a specific position at which a dot is formed by an amount of ink that is different from a predetermined amount of ink;

dot-size select means for selecting an amount of ink in accordance with a signal from said specific position determining means; and dot control means operating such that in a first scan direction of the print head, said dot control means varies said drive voltage to said ink jet print head so that said print head prints data of an image memory in the form of normal dots using said predetermined amount of ink, and reduces the amount of ink ejected at said specific position to zero upon reception of a signal from said dot-size select means, and in a second scan direction, said dot control means varies the drive voltage so that said print head forms a dot at said specific position with the selected amount of ink.

11. A printing method in which normal dots and reduced-ink dots are formed on a print medium, comprising the steps of:

moving a print head in a main scan direction;

shooting a normal amount of ink against said print medium to form said normal dots;

shooting a reduced amount of ink to form said reduced-ink dots at a predetermined interval, wherein said reduced amount of ink is a non-zero amount that is less than said normal amount; and shooting an increased amount of ink to form some of said normal dots, said increased amount being larger than said normal amount.

12. A printing method in which normal dots and reduced-ink dots are formed on a print medium, comprising the steps of:

moving a print head in a main scan direction;

shooting a normal amount of ink against said print medium to form said normal dots; and shooting a reduced amount of ink to form said reduced-ink dots at a predetermined interval, wherein said reduced amount of ink is a non-zero amount that is less than said normal amount, and wherein said reduced-ink dots are the only dots printed on the boundary of a pattern.

* * * * *